United States Patent
Huston et al.

(10) Patent No.: US 8,685,580 B2
(45) Date of Patent: Apr. 1, 2014

(54) FUEL CELL WITH AN ELECTROLYTE STABILIZING AGENT AND PROCESS OF MAKING THE SAME

(75) Inventors: Todd W Huston, Rush, NY (US); Jeanette E. Owejan, Honeoye, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 129 days.

(21) Appl. No.: 12/143,041

(22) Filed: Jun. 20, 2008

(65) Prior Publication Data

US 2009/0317686 A1 Dec. 24, 2009

(51) Int. Cl.
*H01M 8/04* (2006.01)

(52) U.S. Cl.
USPC .......................................... 429/432

(58) Field of Classification Search
USPC .................................... 429/34, 432
See application file for complete search history.

(56) References Cited

U.S. PATENT DOCUMENTS

| | | | |
|---|---|---|---|
| 3,134,689 A | 5/1964 | Pritikin et al. | |
| 4,272,353 A | 6/1981 | Lawrance et al. | |
| 5,272,017 A | 12/1993 | Swathirajan et al. | |
| 6,322,919 B1 * | 11/2001 | Yang et al. | 429/34 |
| 6,335,112 B1 | 1/2002 | Asukabe et al. | |
| 6,465,041 B1 * | 10/2002 | Frisk et al. | 427/228 |
| 6,855,453 B2 | 2/2005 | Bett et al. | |
| 2002/0114990 A1 * | 8/2002 | Fly et al. | 429/44 |
| 2003/0082374 A1 * | 5/2003 | Frisk et al. | 428/364 |
| 2003/0157397 A1 * | 8/2003 | Barton et al. | 429/44 |
| 2004/0018430 A1 | 1/2004 | Holman et al. | |
| 2004/0043283 A1 | 3/2004 | Cipollini et al. | |
| 2004/0224216 A1 | 11/2004 | Burlatsky et al. | |
| 2005/0064275 A1 * | 3/2005 | Mekala et al. | 429/42 |
| 2005/0095355 A1 | 5/2005 | Leistra et al. | |
| 2005/0136308 A1 * | 6/2005 | Andrews et al. | 429/30 |
| 2006/0019140 A1 | 1/2006 | Kawazoe et al. | |
| 2006/0029841 A1 * | 2/2006 | Conrad et al. | 429/19 |
| 2006/0046120 A1 | 3/2006 | Merzougui et al. | |
| 2006/0063054 A1 * | 3/2006 | Frey et al. | 429/33 |
| 2007/0099052 A1 | 5/2007 | Frey et al. | |
| 2008/0107945 A1 | 5/2008 | Coms et al. | |

FOREIGN PATENT DOCUMENTS

| | | |
|---|---|---|
| DE | 69425196 T2 | 12/2000 |
| DE | 10130828 A1 | 1/2003 |
| DE | 69717674 T2 | 12/2003 |
| JP | 2000351605 A * | 12/2000 |
| JP | 2001118591 A | 4/2001 |
| JP | 2007213851 A * | 8/2007 |
| WO | 2005060039 A1 | 6/2005 |
| WO | 2005071779 A2 | 8/2005 |
| WO | 2005124911 A1 | 12/2005 |
| WO | WO 2006048764 A1 * | 5/2006 |

OTHER PUBLICATIONS

Supramaniam Srinivasan et al, Recent Advances in Solid Polymer Electrolyte Fuel Cell Technology With Low Platinum Loading Electrodes, pp. 1623-1629.

* cited by examiner

*Primary Examiner* — Eli Mekhlin
(74) *Attorney, Agent, or Firm* — BrooksGroup

(57) ABSTRACT

One exemplary embodiment may include a fuel cell comprising an electrolyte layer and an electrolyte stabilizing agent. The electrolyte stabilizing agent is disposed in an electrochemically non-active layer and configured to migrate from the non-active layer to the electrolyte layer. Another exemplary embodiment may include a microporous layer comprising an electrolyte stabilizing agent.

13 Claims, 2 Drawing Sheets

FUEL CELL WITH AN ELECTROLYTE STABILIZING AGENT AND PROCESS OF MAKING THE SAME

TECHNICAL FIELD

The field to which the disclosure generally relates includes fuel cells, gas diffusion media and microporous layers.

BACKGROUND

An electrolyte layer in a fuel cell is typically situated between an anode layer and a cathode layer. The electrolyte layer provides the necessary ionic conductivity within a fuel cell. Degradation of the electrolyte layer directly affects cell voltage, current density, and durability of the fuel cell. Even though fluoropolymer based electrolytes have been explored for fuel cell application due to their relatively inherent chemical stability, degradation of such electrolyte still occurs. Consequently, the fuel cell durability for demanding automotive applications is difficult to achieve. To remediate this problem and extend the life of the electrolyte membrane, additives and treatments have been proposed to modify the membrane. When incorporated directly into the electrolyte layer, the additives and treatments may interfere with the ionic conductivity and electrochemical processes in a fuel cell and thus compromise the performance of ion conductive membrane besides adding cost. Additionally, many of the additives can adversely affect the activity of the critical catalyst used in a fuel cell. There is thus a need to improve fuel cell durability without affecting the normal electrochemical process or performance.

SUMMARY OF EXEMPLARY EMBODIMENTS OF THE INVENTION

One exemplary embodiment may include a fuel cell which is comprised of an electrolyte layer and an electrolyte stabilizing agent. The electrolyte stabilizing agent is disposed in an electrochemically non-active layer and configured to migrate from the non-active layer to the electrolyte layer.

One exemplary embodiment may include a gas diffusion medium comprising an electrically conductive fiber matrix and an electrolyte stabilizing agent. The gas diffusion medium may include a microporous layer in which the electrolyte stabilizing agent is incorporated. The microporous layer is configured to have direct contact with an electrochemically active layer.

One exemplary embodiment may include a process comprising: providing plurality of fuel cell layers including electrochemically active and electrochemically non-active layers; incorporating an electrolyte stabilizing agent in at least one of the electrochemically non-active layers, and forming a fuel cell by stacking the electrochemically active and non-active layers together in such a manner that the electrolyte stabilizing agent is able to migrate from a non-active layer to an active layer.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the present invention will become more fully understood from the detailed description and the accompanying drawings, wherein.

DETAILED DESCRIPTION OF EXEMPLARY EMBODIMENTS

The following description of the embodiment(s) is merely exemplary (illustrative) in nature and is in no way intended to limit the invention, its application, or uses.

A fuel cell comprises plurality of electrochemically active and non-active layers stacked together. Electrochemical reactions or processes, such as reduction reaction, oxidation reaction and ionic conduction, take place in electrochemically active layers (herein referred to as active layers). Electrochemically active layers include, for examples, anode, cathode, membrane electrode assembly, electrolyte membrane, and catalyst layers. On the other hand, electrochemical reactions or processes do not take place in an electrochemically non-active layer (herein referred to as non-active layer). A non-active layer may serve the function of electric current collection, gas transportation, gas diffusion, cooling, heating, water management, corrosion protection, or mechanical support. Non-active layers may include, for examples, bipolar plate, gas diffusion layer, microporous layer, hydrophilic coating layer, hydrophobic coating layer, end plate and cooling layer. The active and non-active layers are typically stacked together in such an order that they formed a series of inter-connected electrochemical cells where fuel gas and oxidative gas are effectively distributed to the respective anode and cathode for electrochemical reaction and electric current generation. Stacking of electrochemically active and non-active layers to form a fuel cell are described in U.S. Pat. Nos. 5,272,017 and 6,855,453.

Figure 2:
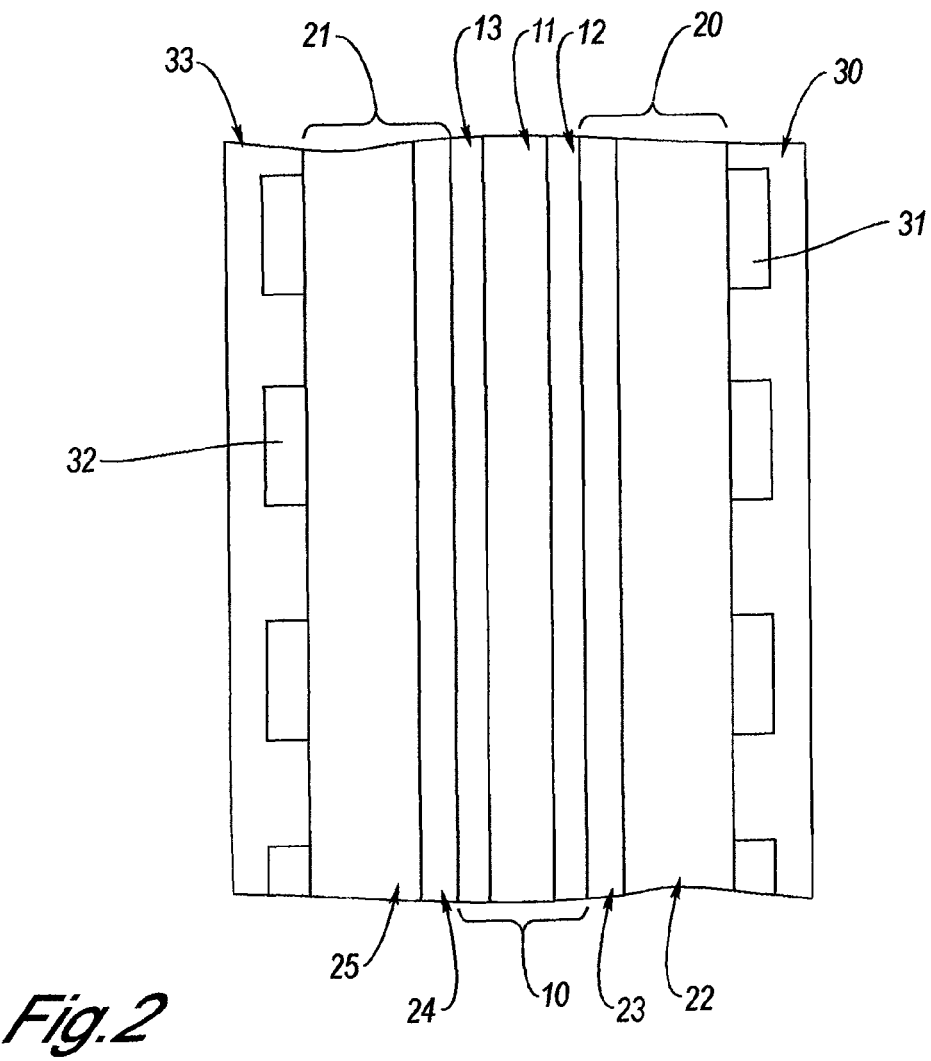
FIG. 2 illustrates a cross-section view of a fuel cell according to one embodiment of this invention.
Figure 3A:
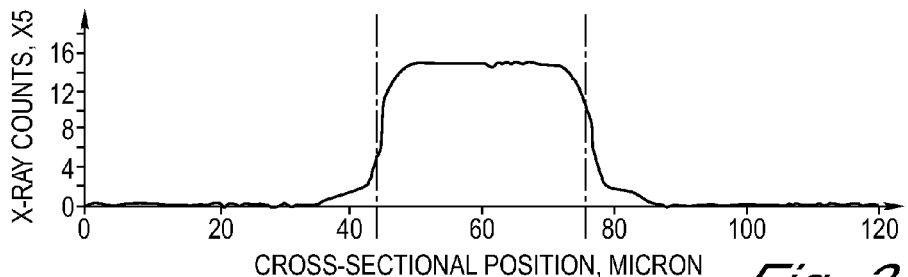
FIG. 3 shows five EPMA (Electron Probe Micro-Analysis) graphs of a membrane electrode assembly in an exemplary fuel cell. The graphs illustrate the migration profile of an electrolyte stabilizing agent within the fuel cell.
Figure 3B:
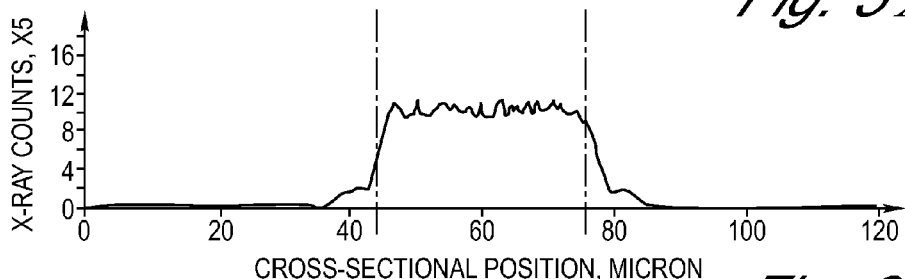
Figure 3C:
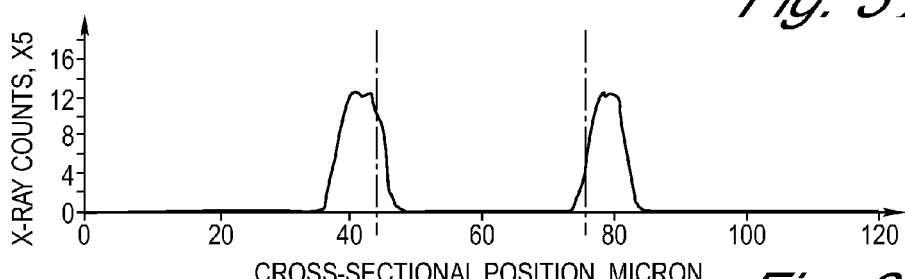
Figure 3D:
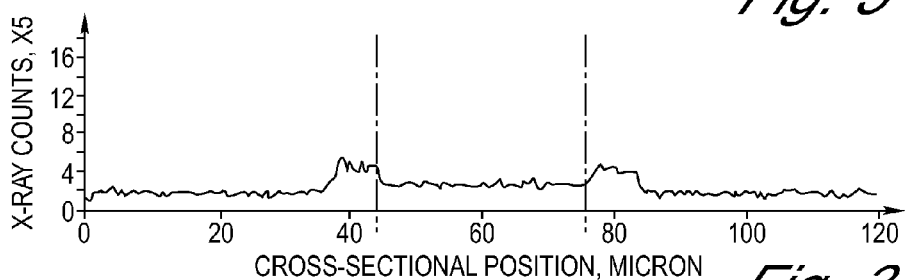
Figure 3E:
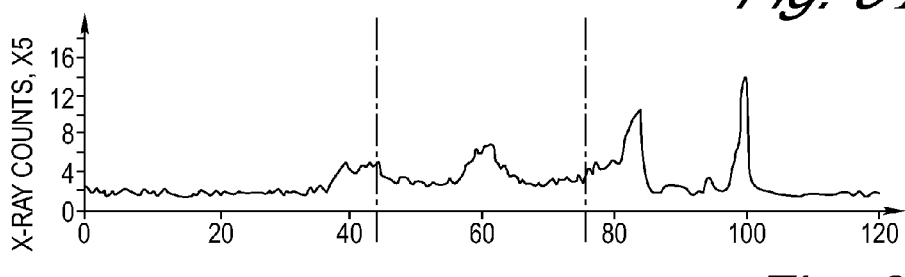

One embodiment of the invention includes a product comprising a fuel cell, the cross-section of which is shown schematically in FIG. 2. The fuel cell may comprise one or more of the section shown in FIG. 2. The fuel cell may include a first fuel cell bipolar plate 30 and a second bipolar plate 33, each including reactant gas flow fields 31 and 32. The reactant gas flow fields may deliver a fuel gas on one side of the bipolar plate and an oxidant gas on the other side of the bipolar plate. The bipolar plate may include a conductive coating on at least the portion that is in direct contact with the neighboring layer(s). The conductive coating may be a thin layer of a noble metal, carbon, metal carbide, metal nitride or conductive oxide. The bipolar plate may be prepared by stamping a thin sheet of metal such as titanium, stainless steel, nickel, chromium, and aluminum alloys to form a designed pattern of channels as the flow fields. The bipolar plate may also be made of graphite, carbon fiber composite or other electrically conductive materials.

The fuel cell may include a membrane electrode assembly 10 comprising an electrolyte layer 11, an anode layer 13 and a cathode layer 12. A first gas diffusion layer (or gas diffusion medium) 20 may overlie the cathode electrode 12. The gas diffusion layer 20 may comprise a first electrically conductive porous matrix layer 22 and an optional first microporous layer 23. The microporous layer 23 is interposed between the first porous matrix layer 22 and the cathode electrode 12. The first bipolar plate 30 may overlie the first gas diffusion layer 20. If desired, a hydrophilic layer (not shown) may be interposed between the first fuel cell bipolar plate 30 and the first gas diffusion layer 20. A second gas diffusion layer 21 may underlie the anode layer 13, comprising a second porous matrix layer 25 and an optional second microporous layer 24. The second microporous layer 24 may be interposed between the second porous matrix layer 25 and the anode layer 13. The second fuel cell bipolar plate 33 may underlie the second gas diffusion layer 21. If desired, a second hydrophilic layer (not shown) may be interposed between the second fuel cell bipolar plate 33 and the second gas diffusion layer 21.

The electrolyte layer 11 may comprise a variety of different types of electrolyte membranes and materials. The electrolyte membrane 11 useful in various embodiments of the invention must be an ion-conductive material. For hydrogen fuel cell, in particular, a proton conductive membrane is typically used. Examples of suitable membranes are disclosed in U.S. Pat. Nos. 4,272,353 and 3,134,689, and in the Journal of Power Sources, Volume 28 (1990), pages 367-387. Such membranes are also known as ion exchange resin membranes. The resins include ionic groups in their polymeric structure; one ionic component is fixed or retained by the polymeric matrix and at least one other ionic component being a mobile replaceable ion is electrostatically associated with the fixed component. The ability of the mobile ion to be replaced under appropriate conditions with other ions imparts ion exchange and ion conduction characteristics to these materials.

The ion exchange resins can be prepared by polymerizing a mixture of ingredients, one of which contains an ionic constituent. One broad class of cationic exchange, proton conductive resins is the so-called sulfonic acid cationic exchange resin. In the sulfonic acid membranes, the cationic exchange groups are sulfonic acid groups which are attached to the polymer backbone. Proton ion associated with the sulfonic acid group provides the proton conductivity. Fluoropolymers having such sulfonic acid group (also called perfluorinated sulfonic acid polymer electrolyte) may be used as the electrolyte membrane material due to the chemical stability of the fluoropolymer matrix.

The formation of these ion exchange resins into membranes is well-known to those skilled in the art. The preferred type is perfluorinated sulfonic acid polymer electrolyte in which the entire membrane structure has ionic exchange/ion conductive characteristics. These membranes are commercially available, and a typical example of a commercial perfluorinated sulfonic acid polymer electrolyte membrane is sold by E. I. DuPont D Nemours & Company under the trade designation NAFION®. Other electrolyte membranes include W. L. Gore's Gore-Select and PRIMEA, Asahi Glass Co. Ltd.'s Flemion and Aciplex, Celanese's PBI (polybenzylimidazole) materials. The use of other types of membranes, such as, but not limited to, perfluorinated cation-exchange membranes, hydrocarbon based cation-exchange membranes as well as anion-exchange membranes are also within the scope of the invention.

The electrodes (including cathode layer and anode layer) may comprise a catalyst layer which may include catalyst particles and an ion conductive material such as a proton conductive polymer electrolyte, intermingled with the particles. The proton conductive polymer electrolyte may be an ionomer such as a perfluorinated sulfonic acid polymer. The catalyst materials may include metals such as platinum, palladium, and mixtures of metals such as platinum and molybdenum, platinum and cobalt, platinum and ruthenium, platinum and nickel, platinum and tin, other platinum transition-metal alloys, and other fuel cell electrocatalysts known in the art. The catalyst materials may be finely divided if desired to provide large electrochemical surface area. The catalyst materials may be unsupported or supported on a variety of materials such as but not limited to finely divided carbon particles. The carbon particle may include carbon black such as Vulcan carbon (such as Vulcan XC-72), acetylene black, carbon nanotube, graphite, Black Pearls 2000, and Ketjen Black.

In one embodiment, at least one electrochemically non-active layer comprises an electrolyte stabilizing agent. The electrolyte stabilizing agent may be configured to migrate from the non-active layer to an active layer, and to an electrolyte layer. Any of the non-active layers described above including bipolar plate, gas diffusion layer, and microporous layer, may include an electrolyte stabilizing agent. The electrolyte stabilizing agent may be configured to migrate from a non-active layer to an active layer by various mechanisms. The electrolyte stabilizing agent may, for example, migrate through direct or indirect physical contact between a non-active layer and an active layer, diffuse to an active layer aided by moisture within the fuel cell, or migrate to an active layer under the influence of electric current flow or electric field within an operating fuel cell. The electrolyte stabilizing agent may be configured to have affinity toward the electrolyte layer, and thus naturally migrates toward the electrolyte layer during the life cycle of the fuel cell. The electrolyte stabilizing agent may comprise a cation (such as a metal cation) that is attracted to the cation-exchange polymer electrolyte membrane or ionomer described above. An effective amount of electrolyte stabilizing agent may be continuously or discretely supplied to the electrolyte layer without adversely affecting its proton conducting performance. An optimized electrolyte stabilizing effect can thus be achieved in this manner and the service life of the fuel cell is extended.

The electrolyte stabilizing agent may include any materials that can provide stabilizing effect to the electrolyte layer. The electrolyte stabilizing agent may include any organic or inorganic compounds. Examples of electrolyte stabilizing agent may include peroxide decomposing agents, free radical scavengers, and polymer stabilizers. Hydrogen peroxide is believed to form at the cathode from the partial reduction of oxygen in the presence of hydrogen ions in a hydrogen fuel cell. Free radicals created by hydrogen peroxide are believed to be responsible for the degradation of the electrolyte layer during fuel cell operation. A peroxide decomposing metal ion or metal compound may be used as the electrolyte stabilizing agent. The metal compound or ion may comprise at least one transition metal element of the Periodic Table of the Elements, i.e. from groups IIIb, IVb, Vb, VIb, VIIb, VIIIb, Ib and IIb, or at least one metallic element from main group 4 (IVa) of the Periodic Table of the Elements. The metal compound may comprise a metal salt, metal oxide, metal alloy or organometallic compound of at least one metal element selected from the group consisting of Mn, Al, Mg, Zn, Co, Fe, Cr, Cu, V, Ru, Pd, Ni, Mo, Sn, Ce, and W. The metal ion may include, but not limited to, at least one of $Mn^{2+}$, $Mn^{3+}$, $Al^{3+}$, $Fe^{3+}$, $Cu^{2+}$, $Cu^{1+}$, $Ce^{3+}$, $Ce^{4+}$, $Mg^{2+}$ and $Zn^{2+}$. In addition to their peroxide decomposing property, the metal ions exhibit affinity towards the proton conductive electrolyte membrane in a hydrogen fuel cell. The metal ions may be configured in various compounds and physical forms that provide effective migration from a non-active layer toward the electrolyte layer in a fuel cell. The metal ion may be provided, for example, in a metal salt of sulfate, sulfonate, carbonate, chloride, nitrate, phosphate, carboxylate, borate, silicate, hexafluoroborate, or perchlorate. The metal ion may also be provided in an organometallic complexes such as metal phthalocyanines and metal EDTA (ethylenediaminetetraacetic acid) complexes. Examples of metal phthalocyanine complexes may include zinc phthalocyanine, copper phthalocyanine, cobalt phthalocyanine, and iron phthalocyanines. Metal EDTA complexes may include EDTA complexes of $Cu^{2+}$, $Cu^{1+}$, $Ce^{3+}$, $Ce^{4+}$, $Mn^{2+}$, $Mn^{3+}$ and $Zn^{2+}$. The metal compound may also include metal oxides and hydroxides of Mn, Al, Mg, Zn, Co, Fe, Cr, Cu, V, Ru, Pd, Ni, Mo, Sn, Ce, and W, such as $Ce_2O_3$, $CeO_2$, $MnO_2$, $RuO_2$, $ZnO$, $WO_3$, $MgO$, $CaO$, $BaO$, $ZrO_2$, $TiO_2$, $MnO_2$, $Al_2O_3$, $RuO_2$, $WO_3$, $CuO$, $Cu_2O$, and $MoO_3$. Examples of metal alloys include, but not limited to, alloys containing at least one of Cu, Ni, Mn and Ce elements.

The first gas diffusion layer 20 and/or the second gas diffusion layer 21 may include an electrolyte stabilizing agent. The gas diffusion layer (GDL) provides a passageway for the reactant gases and optimizes diffusion of reactant gases to the fuel cell catalyst. Water is a reaction product of a hydrogen fuel cell. Excess amount of water generated during fuel cell operation may flood the electrode layer and prevent the reactant gas from reaching the active site of the catalyst within the electrode. The gas diffusion layer may provide water management benefit to the membrane electrode assembly by wicking away excess water while allowing reactant gas to permeate to the catalyst. The gas diffusion layer may comprise an electrically conductive porous matrix material, such as a porous foam, fiber matrix and aggregate of conductive particles. A carbon fiber matrix, for example, may be used as the gas diffusion porous matrix. A carbon fiber matrix may include carbon paper, carbon fiber non-woven, carbon fiber woven cloth, and carbon fiber knitted cloth. Commercial carbon cloth and paper materials are available from Zoltek, SGL group (with trade name Sigracet®) and Toray. The electrolyte stabilizing agent be applied to the gas diffusion layer through impregnation, coating, spraying, sputtering, brushing and any other deposition methods. In various embodiments, the gas diffusion layer may be treated with a hydrophobic agent, such as, but not limited to, polymers and copolymers of vinylidene fluoride, tetrafluroethylene, ethylene, propylene, and hexafluoropropylene. A solution or dispersion of polyvinylidenefluoride (PVDF), polytetrafluoroethylene (PTFE), or poly(tetrafluoroethylene-co-ethylene), for examples, may be used to coat, treat, or impregnate the gas diffusion layer. The hydrophobic agent may be combined with the electrolyte stabilizing agent before applying to the gas diffusion layer. The gas diffusion layer may have an average pore size ranging from 5-40 micrometers. The gas diffusion layer may have a thickness ranging from about 100 to about 500 micrometers. In one embodiment, only the first gas diffusion layer in contact with the cathode layer comprises the electrolyte stabilizing agent.

Figure 1:
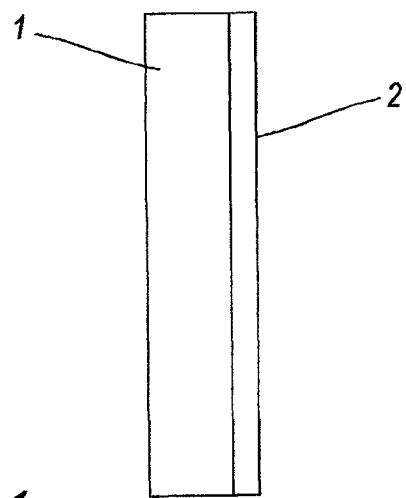
FIG. 1 is a schematic cross-sectional view of a gas diffusion layer according to one embodiment of this invention.

As illustrated in FIG. 1, the gas diffusion layer may include a microporous layer 2 in addition to the porous matrix layer 1. The microporous layer may comprise an electrically conductive particle, a hydrophobic agent and optionally an electrolyte stabilizing agent. The microporous layer may provide proper pore sizes for gas permeation, water management and enhancement of intimate electric contact with neighboring catalyst layer of an electrode. The electrically conductive particle may include carbon particles and any other conductive inert materials such as noble metals and their oxides. Carbon particles may include Vulcan carbon (such as Vulcan XC-72), acetylene black, carbon nanotube, graphite, Black Pearls 2000, and Ketjen Black. The hydrophobic agent may include, but not limited to, polymers and copolymer of vinylidene fluoride, tetrafluroethylene, ethlylene, propylene, and hexafluoropropylene. A solution or dispersion of polyvinylidenefluoride (PVDF), polytetrafluoroethylene (PTFE), or poly(tetrafluoroethylene-co-ethylene), for examples, may be used as the hydrophobic agent. The carbon particle, electrolyte stabilizing agent and hydrophobic agent may be combined into a mixture before applying to the conductive porous matrix of the gas diffusion layer to form a microporous layer. A solvent may be used to facilitate the mixing of ingredients and formation of the microporous layer. Water miscible solvents such as isopropyl alcohol, ethanol, methanol, propylene glycol, ethylene glycol, and other organic solvents may be used alone or in combination with water. The content of hydrophobic agent may range from 5 to 50% (or preferably, 10% to 30%) by weight based on the total weight of the microporous layer. The solids loading in the microporous layer may range from 0.1 to 4 $mg/cm^2$ (preferably, 0.15 to about 2 $mg/cm^2$). The electrolyte stabilizing agent may be present at 0.1 % to about 10% by weight based on the weight of the microporous layer. The thickness of the microporous layer may range from 1 to about 100 micrometers. The microporous layer is configured to have intimate contact with an active electrode layer, or a catalyst layer of an electrode layer. The microporous layer provides optimal permeation for reactant gases and water transport/removal property to prevent flooding at the catalyst layer. In addition, the microporous layer can facilitate the migration of the electrolyte stabilizing agent from the microporous layer to the neighboring electrode and electrolyte layers. The microporous layer may further include an electrolyte material, including a perfluorinated sulfonic acid polymer electrolyte, such as NAFION®. The electrolyte material may further facilitate the migration of the electrolyte stabilizing agent in the microporous layer. The electrolyte stabilizing agent may be present only in the first microporous layer in direct contact with the cathode layer of the fuel cell. In an alternative embodiment, the microporous layer described above may be applied to and form on an anode and/or a cathode layer. Yet another embodiment may include a gas diffusion media layer having two or more microporous layers wherein the microporous layer closest to the membrane includes the additive.

EXAMPLE

One embodiment of the invention includes mixing 2.4 grams of acetylene black carbon (Alfa Aesar), 37 mL deionized water, 32 mL isopropyl alcohol, and 0.2 grams ammonium carbonate, which was ball milled using 30 milliliters of 3.0 mm zirconia beads for 20 hours at 120 rpm. Thereafter, approximately 1.33 grams T-30 (DuPont) which is 60 wt % PTFE in suspension, and 0.25 g cerium(III) carbonate hydrate was added and the mixture removed from the ball mill and hand-shaken for 1 to 2 minutes and coated on a gas diffusion media layer product Toray TGPH-060 with a Meyer rod and thereafter sintered at approximately 380° C. for 30 minutes. The resulting loading of microporous layer is about 0.15 mg/cm2. A gas diffusion layer having a carbon fiber matrix and a cerium ion containing microporous layer is thus prepared.

A membrane electrode assembly (MEA) is made using a DuPont™ NAFION® NRE-211 film as the electrolyte membrane layer. Two electrodes were deposited on the membrane by the decal transfer method. The symmetric anode and cathode electrodes consisted of 0.2 mg $Pt/cm^2$ metal loading and an Asahi Kasei ionomer present at a ionomer to carbon ratio of 0.8. The slurry MEA was hot pressed at 295° F. and 4000 $lb/inch^2$ pressure for 4 minutes.

A hydrogen fuel cell is made by assembling the above MEA, gas diffusion layer, and two bipolar plates (Poco graphite) in a manner similar to what is shown in FIG. 2. Pure hydrogen is supplied to the anode side of the cell and air is supplied to the cathode side of the cell. The fuel cell was conditioned and ran both humidified and partially humidified polarization curves, resulting in a 22 hour duration period. Examples of these operating conditions include a first polarization curve at 60C, 270 kpa absolute pressure, 60C anode and cathode dewpoints, and 2/2 stoichiometry of hydrogen and air; a second partially humidified curve at 80C, 150 kpa absolute pressure, 54C anode and cathode dewpoints, and 1.5/2 stoichiometry of hydrogen and air. EPMA (electron probe micro-analysis) is performed on the MEA cross section of the fuel cell after the test operation. EPMA is conducted by bombarding the cross-section of the MEA sample with a focused electron beam (typical energy=5-30 keV) and collecting the X-ray photons thereby induced and emitted by the various elemental species. EPMA is herein used to profile the elemental distribution cross different layers within the MEA. Five EPMA graphs are obtained and shown in FIG. 3. Graphs (a) and (b) in FIG. 3 represent the fluorine and sulfur element distributions within the MEA. As shown in the graphs, fluorine and sulfur are elements found mostly in the perfluorinated sulfonic acid polymer electrolyte layer located in the middle section of the MEA. EPMA graph of platinum is shown in graph (c) where there are two almost identical peaks. The two platinum peaks reside in the respective anode and cathode sections of the MEA, reflecting the platinum catalyst in the two electrode/catalyst layers. Graph (d) is the cerium EPMA graph of the background noise. The EPMA scan of cerium of the same MEA shown in graph (e) of FIG. 3, revealed significant amount of cerium element in the electrolyte layer and the cathode layer. The cerium element in the cathode and electrolyte layers clearly comes from the migration of cerium ion from the non-active microporous layer. The cerium peak next to the asterisk mark in graph (e) is attributed to a portion of the microporous layer sticking to the catalyst layer during sample preparation as the MEA was peeled off of the GDL.after test operation. The migration of cerium ion to the electrolyte layer during fuel cell operation is thus demonstrated. The durability of the electrolyte layer is improved as a result of the cerium ion migration.

The above description of embodiments of the invention is merely exemplary in nature and, thus, variations thereof are not to be regarded as a departure from the spirit and scope of the invention.

What is claimed is:

1. A fuel cell comprising an electrolyte layer, a gas diffusion layer, and a microporous layer between said electrolyte layer and said gas diffusion layer, wherein said microporous layer comprises an electrolyte material having contained therein electrically conductive particles, an electrolyte stabilizing agent, and a hydrophobic agent, wherein said electrolyte stabilizing agent is present from 0.1 wt. % to 10 wt. % and said hydrophobic agent is present from 5 wt. % to 50 wt. %, based on the total weight of the microporous layer, and wherein said electrolyte stabilizing agent has an affinity for the electrolyte layer so that a metal ion of the electrolyte stabilizing agent migrates from said microporous layer to said electrolyte layer, wherein the electrolyte stabilizing agent comprises zinc phthalocyanine, copper phthalocyanine, iron phthalocyanine, or cobalt phthalocyanine, or an organometallic complex of $Cu^{2+}$, $Cu^{1+}$, $Ce^{3+}$, $Ce^{4+}$, $Mn^{2+}$, $Mn^{3+}$ or $Zn^{2\pm}$.

2. A fuel cell as set forth in claim 1, wherein said electrolyte layer is a proton conductive membrane.

3. A fuel cell as set forth in claim 1, wherein said microporous layer comprises a carbon particle, a hydrophobic polymer and said electrolyte stabilizing agent.

4. A fuel cell as set forth in claim 1 further comprising an anode and a cathode, wherein said anode and cathode are disposed on opposite sides of said electrolyte layer and said microporous layer is in contact with at least one of said anode and cathode such that said metal ion provided by said electrolyte stabilizing agent is configured to migrate from said microporous layer to at least one of said anode and cathode, and to said electrolyte layer.

5. A fuel cell as set forth in claim 4, wherein said metal ion provided by said electrolyte stabilizing agent is cerium ion.

6. A fuel cell as set forth in claim 4, wherein said electrolyte layer comprises a perfluorinated sulfonic acid polymer electrolyte.

7. A fuel cell comprising an electrolyte layer, a gas diffusion layer, and a microporous layer between said electrolyte layer and said gas diffusion layer, wherein said microporous layer comprises an electrolyte material having contained therein electrically conductive particles, an electrolyte stabilizing agent, and a hydrophobic agent, wherein said electrolyte stabilizing agent is present from 0.1 wt. % to 10 wt. % and said hydrophobic agent is present from 5 wt. % to 50 wt. %, based on the total weight of the microporous layer, and wherein said electrolyte stabilizing agent provides a metal ion that migrates from said microporous layer to said electrolyte layer, wherein the electrolyte stabilizing agent comprises an alloy comprising at least one of Cu, Ni, Mn or Ce elements.

8. A process comprising: providing a plurality of fuel cell component layers including electrochemically active and electrochemically non-active layers, wherein said electrochemically active layers include an anode layer, a cathode layer, and an electrolyte membrane layer, and said electrochemically non-active layers include a gas diffusion layer and a microporous layer; combining an electrolyte stabilizing agent and a hydrophobic agent into a solution or dispersion; incorporating said solution or dispersion, in which said electrolyte stabilizing agent and said hydrophobic agent have been previously combined in at least one of said electrochemically non-active layers; and forming a fuel cell by stacking said electrochemically active and non-active layers together such that said electrolyte stabilizing agent provides a metal ion from a non-active layer to an active layer during operation of said fuel cell, wherein the electrolyte stabilizing agent comprises an alloy comprising at least one of Cu, Ni, Mn or Ce elements.

9. A fuel cell comprising an electrolyte layer, a gas diffusion layer, and a microporous layer between said electrolyte layer and said gas diffusion layer, wherein said microporous layer comprises an electrolyte material having contained therein electrically conductive particles, an electrolyte stabilizing agent, and a hydrophobic agent, wherein said electrolyte stabilizing agent is present from 0.1 wt. % to 10 wt. % and said hydrophobic agent is present from 5 wt. % to 50 wt. %, based on the total weight of the microporous layer, and wherein said electrolyte stabilizing agent has an affinity for the electrolyte layer so that a metal ion of the electrolyte stabilizing agent migrates from said microporous layer to said electrolyte layer, wherein the electrolyte stabilizing agent comprises zinc phthalocyanine, copper phthalocyanine, iron phthalocyanine, or cobalt phthalocyanine, or an organometallic complex of $Cu^{2+}$, $Cu^{1+}$, $Ce^{3+}$, $Ce^{4+}$, or $Zn^{2+}$.

10. A fuel cell comprising an electrolyte layer, a gas diffusion layer, and a microporous layer between said electrolyte layer and said gas diffusion layer, wherein said microporous layer comprises an electrolyte material having contained therein electrically conductive particles, an electrolyte stabilizing agent, and a hydrophobic agent, wherein said electrolyte stabilizing agent is present from 0.1 wt. % to 10 wt. % and said hydrophobic agent is present from 5 wt. % to 50 wt. %, based on the total weight of the microporous layer, and wherein said electrolyte stabilizing agent has an affinity for the electrolyte layer so that a metal ion of the electrolyte stabilizing agent migrates from said microporous layer to said electrolyte layer, wherein the electrolyte stabilizing agent comprises zinc phthalocyanine, copper phthalocyanine, iron phthalocyanine, or cobalt phthalocyanine, or an organometallic complex of $Cu^{2+}$, $Cu^{1+}$, $Ce^{3+}$, or $Zn^{2+}$.

11. A process comprising: providing a plurality of fuel cell component layers including electrochemically active and electrochemically non-active layers, wherein said electrochemically active layers include an anode layer, a cathode layer, and an electrolyte membrane layer, and said electrochemically non-active layers include a gas diffusion layer and a microporous layer; combining an electrolyte stabilizing agent and a hydrophobic agent into a solution or dispersion; applying said solution or dispersion to the microporous layer to form a treated microporous layer such that 0.1 wt. % to 10 wt. % of said electrolyte stabilizing agent and 5 wt. % to 50 wt. % of said hydrophobic agent based on the total weight of the treated microporous layer have been previously combined and incorporated in the treated microporous layer; and forming a fuel cell by stacking said electrochemically active layers, said gas diffusion layer and said treated microporous layer together such that said electrolyte stabilizing agent provides a metal ion from the treated microporous layer to an active layer during operation of said fuel cell, wherein the electrolyte stabilizing agent comprises zinc phthalocyanine, copper phthalocyanine, iron phthalocyanine, or cobalt phthalocyanine, or an organometallic complex of $Cu^{2+}$, $Cu^{1+}$, $Ce^{3+}$, $Ce^{4+}$, $Mn^{2+}$, $Mn^{3+}$ or $Zn^{2+}$.

12. A process comprising: providing a plurality of fuel cell component layers including electrochemically active and electrochemically non-active layers, wherein said electrochemically active layers include an anode layer, a cathode layer, and an electrolyte membrane layer, and said electrochemically non-active layers include a gas diffusion layer and a microporous layer; combining an electrolyte stabilizing agent and a hydrophobic agent into a solution or dispersion; applying said solution or dispersion to the microporous layer to form a treated microporous layer such that 0.1 wt. % to 10 wt. % of said electrolyte stabilizing agent and 5 wt. % to 50 wt. % of said hydrophobic agent based on the total weight of the treated microporous layer have been previously combined and incorporated in the treated microporous layer; and forming a fuel cell by stacking said electrochemically active layers, said gas diffusion layer and said treated microporous layer together such that said electrolyte stabilizing agent provides a metal ion from the treated microporous layer to an active layer during operation of said fuel cell, wherein the electrolyte stabilizing agent comprises zinc phthalocyanine, copper phthalocyanine, iron phthalocyanine, or cobalt phthalocyanine, or an organometallic complex of $Cu^{2+}$, $Cu^{1+}$, $Ce^{3+}$, $Ce^{4+}$, or $Zn^{2+}$.

13. A process comprising: providing a plurality of fuel cell component layers including electrochemically active and electrochemically non-active layers, wherein said electrochemically active layers include an anode layer, a cathode layer, and an electrolyte membrane layer, and said electrochemically non-active layers include a gas diffusion layer and a microporous layer; combining an electrolyte stabilizing agent and a hydrophobic agent into a solution or dispersion; applying said solution or dispersion to the microporous layer to form a treated microporous layer such that 0.1 wt. % to 10 wt. % of said electrolyte stabilizing agent and 5 wt. % to 50 wt. % of said hydrophobic agent based on the total weight of the treated microporous layer have been previously combined and incorporated in the treated microporous layer ; and forming a fuel cell by stacking said electrochemically active layers, said gas diffusion layer and said treated microporous layer together such that said electrolyte stabilizing agent provides a metal ion from the treated microporous layer to an active layer during operation of said fuel cell, wherein the electrolyte stabilizing agent comprises zinc phthalocyanine, copper phthalocyanine, iron phthalocyanine, or cobalt phthalocyanine, or an organometallic complex of $Cu^{2+}$, $Cu^{1+}$, $Ce^{3+}$, or $Zn^{2+}$.

* * * * *